Figure 1:
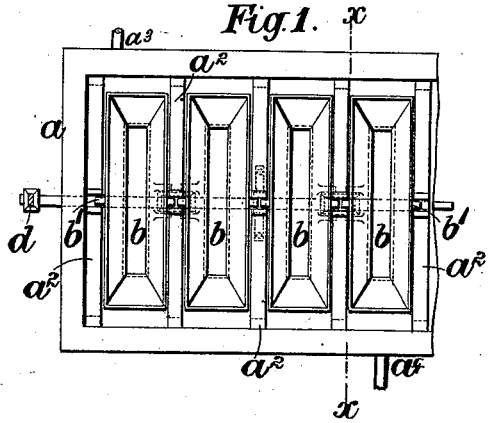

(No Model.) 2 Sheets—Sheet 1.

F. B. HILL.
MANUFACTURE OF ICE AND APPARATUS THEREFOR.

No. 507,005. Patented Oct. 17, 1893.

Witnesses:
J. A. Rutherford
Robert Everett

Inventor:
Frederick B. Hill
By James L. Norris
Attorney (No Model.) 2 Sheets—Sheet 2.

F. B. HILL.
MANUFACTURE OF ICE AND APPARATUS THEREFOR.

No. 507,005. Patented Oct. 17, 1893.

Witnesses:
Inventor: Frederick B. Hill

UNITED STATES PATENT OFFICE.

FREDERICK BARKER HILL, OF LONDON, ENGLAND, ASSIGNOR TO THE HILLS COLD STORAGE COMPANY, LIMITED, OF SAME PLACE.

MANUFACTURE OF ICE AND APPARATUS THEREFOR.

SPECIFICATION forming part of Letters Patent No. 507,005, dated October 17, 1893.

Application filed June 9, 1892. Serial No. 436,163. (No model.) Patented in England November 11, 1889, No. 17,973.

*To all whom it may concern:*

Be it known that I, FREDERICK BARKER HILL, engineer, a subject of the Queen of Great Britain, residing at London, England, have invented new and useful Improvements in the Manufacture of Ice and in Apparatus Therefor, (for which I have obtained a patent in Great Britain, No. 17,973, bearing date November 11, 1889,) of which the following is a specification, reference being had to the accompanying drawings.

My invention relates to the manufacture of ice and to apparatus therefor.

It is well known that in order to produce clear ice, it is necessary to keep the liquid from which the same is to be made in a state of constant agitation during the process of freezing. For this purpose, various devices have heretofore been employed, such as mechanical stirrers; and in some instances the desired result has been sought to be attained by causing suitable vessels containing the liquid to be frozen to slide to and fro in the brine or other freezing medium. All the attempts heretofore made to attain the desired result have, however, been unsuccessful or more or less unsatisfactory. It has been proposed to impart to the vessels containing the liquid to be frozen a slight oscillating motion about pivots or trunnions extending from their ends; but, by this movement of the said vessels, only a slight agitation of the liquid is caused. Now I have discovered that very good results can be attained by causing a swash of the liquid to be frozen from end to end of the vessel or pan containing the same, in such manner that the said liquid will flow alternately in either direction in contact with the bottom of the said vessel or with the layer of ice formed thereon, while brine or other suitable non-congealable liquid is circulated around the exterior of the said vessel or pan. According to my present invention, therefore, I first pour the liquid to be frozen into elongated vessels or pans so arranged in a tank or chamber through which the brine or other non-congealable liquid is circulated, that each of the said vessels or pans can be moved about suitable pivots or trunnions, the axis of which extends transversely to the vessel or pan; and I then cause the said vessels or pans to constantly swing or oscillate about the said pivots or trunnions during the freezing of the liquid which they contain.

In the accompanying drawings I have shown how my said invention may be conveniently and advantageously carried into practice.

Figure 2:
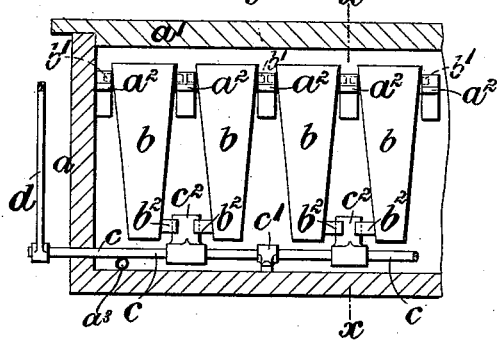
Figure 3:
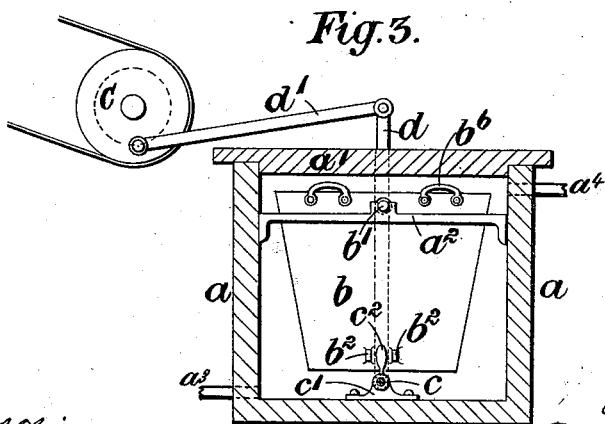
Figure 4:
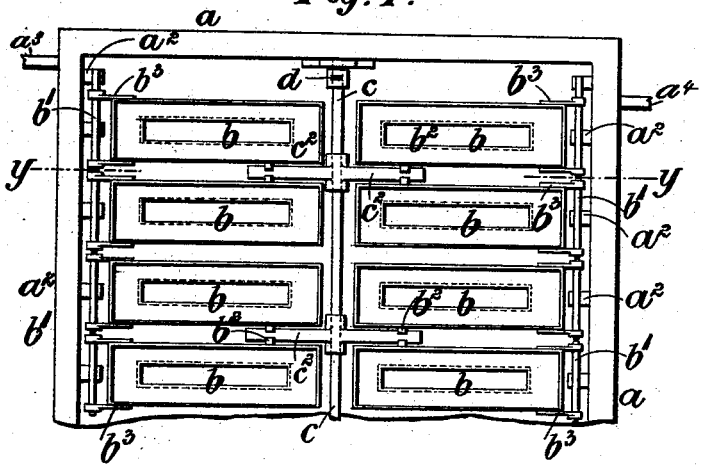

Figure 1 is a plan, the lid or cover being removed, and Fig. 2 a vertical longitudinal section, of a portion of one form of my improved ice-making apparatus. Fig. 3 is a transverse section on the line $x, x$ Figs. 1 and 2. Fig. 4 is a plan, the lid or cover being removed, and Fig. 5 a transverse section on the line $y$ $y$ Fig. 4 showing another form or modification of my improved apparatus. Fig. 6 is a transverse section illustrating a further modification of my said apparatus.

Like letters indicate corresponding parts throughout the drawings.

$a$ is the tank or chamber for containing the brine or other non-congealable liquid, which is delivered into the said tank from a suitable refrigerating apparatus through a pipe $a^3$, and leaves the said tank through a pipe $a^4$, the circulation being maintained by means of a pump, or in any other well known manner.

I do not deem it necessary to illustrate the refrigerating apparatus, nor the pump above alluded to.

$a'$ is the lid or cover of the said tank or chamber.

$b, b$ are the pans or vessels for containing the liquid to be frozen.

In Figs. 1, 2 and 3 I have shown an arrangement in which each of the pans or vessels $b$ is provided at or near its upper end with trunnions or pivots $b'$ whereby it is supported in grooves or bearings in cross-pieces $a^2$ secured to the inside of the brine tank or chamber $a$. Each pan or vessel $b$ is, moreover, provided at or near its lower end with lateral projections or studs $b^2$. Oscillating or swinging motion is imparted to the said pans or vessels $b$ through the medium of a rock-shaft $c$ which is supported in bearings $c'$ secured to the bottom of the brine tank or chamber $a$. The said rock-shaft is provided with arms or wipers $c^2$ which extend upward between the projections or studs $b^2$ on the pans or vessels $b$. On one end of the rock-shaft $c$ is firmly secured a lever or crank-arm $d$, which is connected at its upper end by a rod $d'$ to a disk-crank $e$ driven by a belt from any suitable motor.

Figure 5:
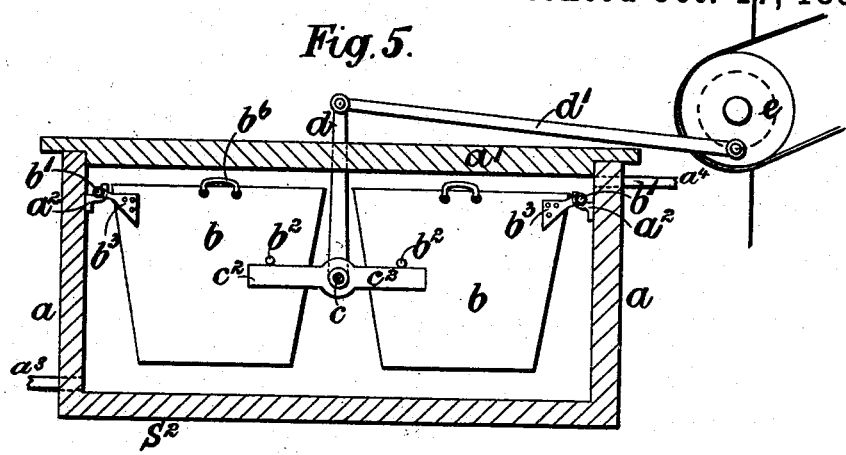
Figure 6:
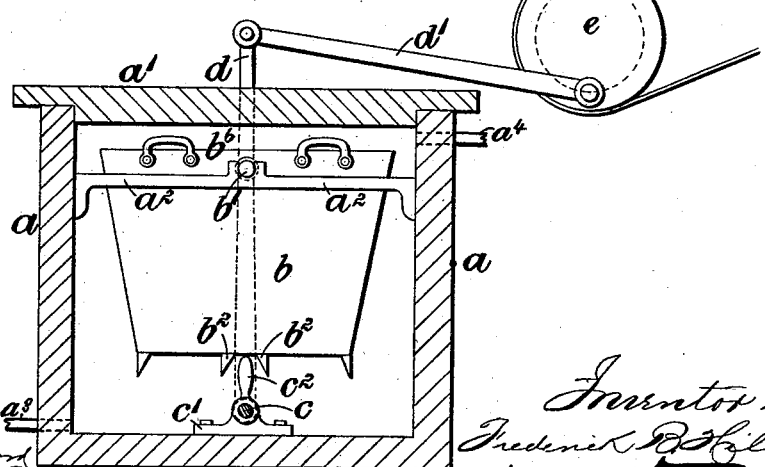

In the form or modification of my invention illustrated in Figs. 4 and 5, the pans or vessels $b$ are arranged in parallel rows or series. The pans or vessels of each row or series are secured at their outer end by means of arms or lugs $b^3$ to a rod or pivot $b'$ which is supported in brackets $a^2$ attached to the inside of the brine tank or chamber $a$. The said pans or vessels $b$ are supported at their inner end by means of lateral projections or studs $b^2$ which rests upon arms $c^2$ keyed or otherwise firmly secured upon the rock-shaft $c$.

In Fig. 6 I have shown a further modification of my invention wherein the arms or wipers $c^2$ instead of engaging with projections arranged on the side of the pans or vessels $b$ as hereinbefore described engage with projections or studs $b^2$ upon the under side of the said pans or vessels.

To facilitate the removal of the pans or vessels $b$ from the brine tank for the purpose of discharging the ice therefrom they are preferably provided with handles $b^6$ riveted or otherwise secured to their upper edge.

The operation of my improved apparatus is as follows, viz:—The tank or chamber $a$ having been filled with brine or other suitable non-congealable liquid, and the pans or vessels $b$ with the liquid to be frozen, the disk-crank $e$ is set in rotation by a belt from a steam engine or other suitable motor; oscillating motion is thus imparted to the rock-shaft $c$ the projections or wipers $c^2$ of which acting upon the projections or studs on the pans or vessels $b$ move the said pans or vessels alternately in either direction about their pivots or trunnions $b'$, thus keeping the liquid in constant agitation during the freezing of the same, and causing the said liquid to flow from end to end of the vessels or pans alternately in either direction in contact with the bottom of the said vessels or pans or with the layer of ice formed thereon.

It will be seen that, in the apparatus shown in Figs. 4 and 5 the pans or vessels $b$ will, during the oscillation of the rock-shaft $c$ as hereinbefore described, be alternately raised and lowered at their inner ends by the arms $c^2$ the pans or vessels of one row or series being raised while those of the other row or series are lowered and vice versa.

I claim—

In an apparatus for the production of ice, the combination of a tank $a$ through which a non-congealable liquid is circulated, elongated pans or receptacles $b$ for the liquid to be frozen, arranged within the said tank and mounted upon trunnions or pivots $b'$, the axes of which extend transversely to the said pans, studs or projections $b^2$ on the said pans, a rock-shaft $c$ mounted in bearings in the said tank and provided with an arm $c^2$ to engage with the said studs or projections, and means for rocking the said rock-shaft, substantially as and for the purpose described.

FREDERICK BARKER HILL.

Witnesses:
   JOHN T. KNOWLES,
   DAVID YOUNG,
*Both of* 11 *and* 12 *Southampton Buildings, London, W. C.*